US012437591B2

(12) United States Patent
Kling et al.

(10) Patent No.: US 12,437,591 B2
(45) Date of Patent: Oct. 7, 2025

(54) CONTROLLING OF A LOCK UNIT FOR HYGIENE EQUIPMENT

(71) Applicant: Essity Hygiene and Health Aktiebolag, Gothenburg (SE)

(72) Inventors: Robert Kling, Gothenburg (SE); Per Möller, Borlänge (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 153 days.

(21) Appl. No.: 18/548,361

(22) PCT Filed: Mar. 2, 2021

(86) PCT No.: PCT/EP2021/055141
§ 371 (c)(1),
(2) Date: Aug. 30, 2023

(87) PCT Pub. No.: WO2022/184236
PCT Pub. Date: Sep. 9, 2022

(65) Prior Publication Data

US 2024/0135762 A1 Apr. 25, 2024
US 2024/0233463 A9 Jul. 11, 2024

(51) Int. Cl.
*G07C 9/00* (2020.01)

(52) U.S. Cl.
CPC ................................ *G07C 9/00309* (2013.01)

(58) Field of Classification Search
CPC ..... G07C 9/00309; G07F 9/001; G07F 9/002; G07F 9/10
See application file for complete search history.

(56) References Cited

U.S. PATENT DOCUMENTS

| | | | | |
|---|---|---|---|---|
| 5,356,051 | A | 10/1994 | Azuma et al. | |
| 9,892,372 | B2 * | 2/2018 | Himmelmann | G08B 21/245 |
| 2011/0042503 | A1 | 2/2011 | Hagleitner | |
| 2015/0315008 | A1 | 11/2015 | Locke et al. | |
| 2020/0302775 | A1 * | 9/2020 | Liu | G06K 7/10366 |

(Continued)

FOREIGN PATENT DOCUMENTS

| | | | |
|---|---|---|---|
| CN | 107536549 | A | 1/2018 |
| CN | 209859220 | U | 12/2019 |
| DE | 69125005 | | 4/1997 |

(Continued)

OTHER PUBLICATIONS

International Search Report for International Application No. PCT/EP2021/055141; International Filing Date: Mar. 2, 2021; Date of Mailing: Nov. 22, 2021; 3 pages.

(Continued)

*Primary Examiner* — Nabil H Syed
(74) *Attorney, Agent, or Firm* — CANTOR COLBURN LLP

(57) ABSTRACT

The present invention relates to data collection comprising the receiving of inbound data from a hygiene equipment, the inbound data indicating a filling status of the hygiene equipment acquired by a data acquisition unit of the hygiene equipment, and comprising the transmitting of outbound data to the hygiene equipment, the outbound data changing a behaviour with regard to a lock unit of the hygiene equipment based on the filling status of the hygiene equipment.

36 Claims, 7 Drawing Sheets

(56) References Cited

U.S. PATENT DOCUMENTS

| | | | |
|---|---|---|---|
| 2021/0043023 | A1 | 2/2021 | Coder et al. |

FOREIGN PATENT DOCUMENTS

| | | | | |
|---|---|---|---|---|
| JP | H0611591 | U | 2/1994 | |
| JP | 2016013331 | A | 1/2016 | |
| KR | 200395178 | Y1 | 9/2005 | |
| KR | 20190075290 | A | 7/2019 | |
| TW | M563851 | U | 7/2018 | |
| WO | 2011079352 | A1 | 7/2011 | |
| WO | 2014035308 | A1 | 3/2014 | |
| WO | WO-2020126037 | A1 * | 6/2020 | ............... H04Q 9/00 |

OTHER PUBLICATIONS

Written Opinion for International Application No. PCT/EP2021/055141; International Filing Date: Mar. 2, 2021; Date of Mailing: Nov. 22, 2021; 8 pages.
CN 1st Office Action with English Translation: CN Application No. 202180095069.5; Date Mailed: Jul. 19, 2025; pp. 1-30.
EP Communication Pursuant to Article 94(3) EPC; Application No. 21709655.1-1201; Date Mailed: May 13, 2025; pp. 1-6.

* cited by examiner

CONTROLLING OF A LOCK UNIT FOR HYGIENE EQUIPMENT

CROSS REFERENCE TO RELATED APPLICATIONS

This application is a National Stage Application of PCT/EP2021/055141, filed Mar. 2, 2021, which is incorporated by reference in its entirety herein.

TECHNICAL FIELD

The present invention relates to controlling of a lock unit for hygiene equipment. In particular, the present invention relates to a data collection unit, a data collection method, a piece of hygiene equipment, a method for the piece of hygiene equipment, and a system comprising the data collection unit and the piece of hygiene equipment.

BACKGROUND

Today, the need for proper hygiene, in particular in the form of hand hygiene, is widely acknowledged. For this reason, public or commercial facilities such as washrooms in public buildings, offices, restaurants, airports, hospitals, shopping malls and so on are normally provided with dispensers for various consumable goods, for example paper towels, liquid soap, and toilet paper. The purpose is to make such consumables easily available to the guests in the washrooms.

Consumables are normally stored in said dispensers, which for this purpose are fixedly located at suitable positions in the washroom. A dispenser can for example be in the form of a holder for paper towels, a holder for toilet paper or a container for liquid soap. Other types of dispensers, for example waste bins, are also used.

The task of checking the level of each consumable, and refilling a dispenser when necessary, i.e. when the level of the consumable is low, or emptying a bin when the level of the consumable is high, is normally assigned to a cleaning staff or a janitor.

One problem for a janitor is to know when a dispenser needs refilling to avoid, for example, a guest of a washing room being left without paper, soap, etc. In addition, the janitor needs to know which dispensers need to be refilled and how much consumable material to bring when servicing an area containing a number of dispensers. Furthermore, from a management point of view, it can be difficult to know in advance how many consumable products should be ordered and kept in stock. For these reasons, there is a need for dispensers which are arranged for monitoring the actual use of the consumable and for signaling in some suitable manner to a central service office that, for example, a particular dispenser needs refilling.

To this end, it is known that a modern dispenser may comprise one or more sensors which are arranged for detecting the level of the consumable within the dispenser. Generally, such sensors can be arranged for recognizing any condition indicating that the level of a consumable is low, i.e. by detecting that the level of the consumable is below a predetermined threshold value. The sensor in question can, for example, be based on an infrared sensor which is arranged for detecting when the height of a paper stack, such as a stack of paper towels in a dispenser, falls below a specified low paper threshold. This threshold corresponds to a condition in which the dispenser needs refilling.

There exist also solutions in which a dispenser is arranged for automatically dispensing a consumable. An example is an automatic soap dispenser which is arranged for automatically discharging a small amount of soap when a user holds a hand under an output nozzle of the dispenser. Such a dispenser can be arranged with sensor arrangements which keep track of the number of occasions that the nozzle has been actuated. The number of occasions can then be used for estimating the amount of consumable which has been fed from the dispenser, and consequently also the remaining amount. When a predetermined minimum threshold has been reached, the dispenser can send a signal to a central service office indicating that it needs refilling. A cleaning staff or janitor then refills or empties the dispenser as needed.

Other types of sensors can, for example, be based on a light emitting diode and a photodetector which together can be used for detecting the level of a consumable within a dispenser. A further example is a counter device counting the number of turns on a feeding part in a toilet paper dispenser, wherein the accumulated number of turns corresponds to a certain consumption of toilet paper.

Furthermore, sensors can not only be used for dispensers, but also for other types of non-dispensing or non-disposing pieces of hygiene equipment. For example, non-dispensing or non-disposing pieces of hygiene equipment may be units having sensors for counting a number of people being present, for counting a number of people passing the sensor, i.e. visitor registration units, door passage units, or the like. A visitor registration unit may comprise a sensor which detects the presence or absence of people in, for example, a washing room or any other predefined area. If the sensor has counted a minimum number of people having been present in the area after, for example, the last cleaning, the sensor may alarm a cleaning staff or any other person being responsible for cleaning the area that cleaning the predefined area is necessary.

A sensor for a door passage unit may work similar to a visitor registration unit, wherein the sensor in the door passage unit may register how many people have passed through the door. If a predefined number of people have passed through the door, i.e. a threshold has been exceeded, the cleaning staff or any other person responsible for cleaning, may be alarmed to clean the corresponding room, etc. Also in this case it may be possible to provide a sensor in the door passage unit which is able to identify people wearing a tag in order to identify when someone from the cleaning staff enters the room and thus may clean the room.

As mentioned above, a sensor which is associated with a dispensing or disposing hygiene equipment, like a dispenser for a consumable, a waste bin, etc., or non-dispensing hygiene equipment, like visitor registration units, door passage units, etc., can be connected to a central service office, i.e. to a central computer server, so that the server is notified when a particular dispenser needs refilling or when a specific, room, area, or equipment has to be cleaned after a specific number of people has been present in the room or has used the equipment, or has passed through a door. A notification relating to a dispenser low condition or to a condition of frequent usage can then be forwarded to members of a cleaning staff, who then has the responsibility of refilling/emptying that particular dispenser or cleaning the room, hygiene equipment, or the like as soon as possible.

A particular problem which is relevant with regard to pieces of hygiene equipment is that unauthorized opening of the housing of a piece of hygiene equipment should be avoided. It is often a problem that an unauthorized person not being a cleaning staff or janitor tries to open the housing of the piece of hygiene equipment to steal the consumable goods stored in the piece of hygiene equipment.

Thus, pieces of hygiene equipment are often equipped with a mechanical lock unit that locks the housing of the piece of hygiene equipment. The housing can then only be unlocked by means of an unlock unit like a key, magnet card, or the like. For example, only authorized people, like cleaning staff, janitor, or the like, have the unlock unit to unlock and lock the hygiene equipment.

Often, also electrical lock units are used which comprises electrical means in addition to the mechanical lock units. The electrical lock unit can transmit and receive data and can be put, for example, in a locking or unlocking state by means of signals instead of keys or the like. For example, the cleaning staff has an application installed on a mobile device, smartphone, tablet, or the like and can choose to lock or unlock the piece of hygiene equipment using the application. When the cleaning staff chooses to unlock the piece of hygiene equipment using the mobile device or the like, an unlock signal may be transmitted from the mobile device to the lock unit installed in the hygiene equipment which then unlocks the piece of hygiene equipment. When the cleaning staff chooses to lock the piece of hygiene equipment using the mobile device or the like, a lock signal may be transmitted from the mobile device to the lock unit installed in the hygiene equipment which then locks the piece of hygiene equipment.

Thus, it is avoided that unauthorized people can access the consumable products stored in the hygiene equipment.

However, by using lock units in pieces of hygiene equipment, the burden on the cleaning staff, janitor, or the like increases. The cleaning staff or janitor is often responsible for a large number of hygiene equipment pieces. However, by always locking and unlocking the pieces of hygiene equipment, the working efficiency decreases and the workload increases. Thus, it is desired to improve the usability of hygiene equipment pieces while avoiding unauthorized access to the products stored therein.

Furthermore, due to the high workload of the cleaning staff, janitor, or the like, mistakes may occur, and the cleaning staff may forget to lock the piece of hygiene equipment after refilling or emptying. Thus, unauthorized access may be again possible.

SUMMARY OF THE INVENTION

Consequently, it is an object of the present invention to solve the above-mentioned problems and provide an apparatus, system, and method to avoid unauthorized access to the products stored in hygiene equipment pieces, while reducing the workload of the cleaning staff, janitor, or the like. Thus, it is an object of the present invention to provide a data collection unit, a method thereof, a piece of hygiene equipment, a method thereof, and a system for securely and effectually locking and unlocking a piece of hygiene equipment, wherein an authorized person is able to easily and quickly access a piece of hygiene equipment when needed. The mentioned problems are solved by the subject-matter of the independent claims. Further preferred embodiments are defined in the dependent claims.

According to one aspect of the present invention there is provided a data collection method, comprising the steps of receiving inbound data from a hygiene equipment, the inbound data indicating a filling status of the hygiene equipment acquired by a data acquisition unit of the hygiene equipment; and transmitting outbound data to the hygiene equipment, the outbound data changing a behaviour with regard to a lock unit of the hygiene equipment based on the filling status of the hygiene equipment. In a related embodiment, the method is implemented by a server in a network, e.g. the Internet.

According to one aspect of the present invention there is provided a network-based service comprising the functionalities of receiving inbound data from a hygiene equipment, the inbound data indicating a filling status of the hygiene equipment acquired by a data acquisition unit of the hygiene equipment, and transmitting outbound data to the hygiene equipment, the outbound data changing a behaviour with regard to a lock unit of the hygiene equipment based on the filling status of the hygiene equipment. In a related embodiment, the service is provided by a server or processing cloud-based resources.

According to one aspect of the present invention there is provided a piece of hygiene equipment, comprising a housing having an interior volume for holding a hygiene equipment product, the hygiene equipment housing having a fixed part and an openable part which is movable or removable with respect to the fixed part to provide access to the interior volume; a lock unit configured to lock, in a locking state, the openable part to the fixed part of the hygiene equipment or unlock, in an unlocking state, the openable part from the fixed part of the hygiene equipment; at least one transmitting unit configured to transmit inbound data indicating a filling status of the hygiene equipment to a data collection unit; and at least one receiving unit configured to receive outbound data from the data collection unit, the outbound data changing a behaviour with regard to the lock unit of the hygiene equipment based on the filling status of the hygiene equipment.

According to one aspect of the present invention there is provided a method for a piece of hygiene equipment, wherein the piece of hygiene equipment comprises a hygiene equipment housing having an interior volume for holding a hygiene equipment product, the hygiene equipment housing having a fixed part and an openable part which is movable or removable with respect to the fixed part to provide access to the interior volume, and a lock unit to lock the openable part to the fixed part of the hygiene equipment or unlock the openable part from the fixed part of the hygiene equipment, the method comprising the steps of transmitting inbound data indicating the filling status of the hygiene equipment to a data collection unit; and receiving outbound data from the data collection unit, the outbound data changing a behaviour with regard to the lock unit of the hygiene equipment based on the filling status of the hygiene equipment.

According to one aspect of the present invention there is provided a data collection unit, comprising a receiving unit configured to receive inbound data from a hygiene equipment, the inbound data indicating a filling status of the hygiene equipment acquired by a data acquisition unit of the hygiene equipment; a processing unit configured to initiate a command toward the hygiene equipment to change a behaviour of a lock unit of the hygiene equipment based on the filling status; and a transmitting unit configured to transmit outbound data indicating the command to the hygiene equipment.

According to one aspect of the present invention there is provided a system, comprising a data collection unit according to one of the respective embodiments and a piece of hygiene equipment according to one of the respective embodiments.

BRIEF DESCRIPTION OF THE DRAWINGS

Embodiments of the present invention, which are presented for better understanding the inventive concepts and which are not to be seen as limiting the invention, will now be described with reference to the Figures in which.

and

Figure 6:
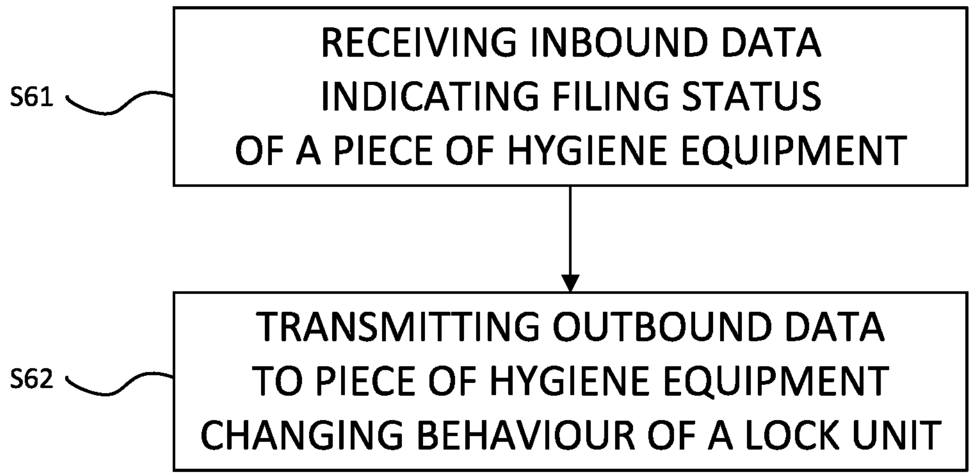
Figure 7:
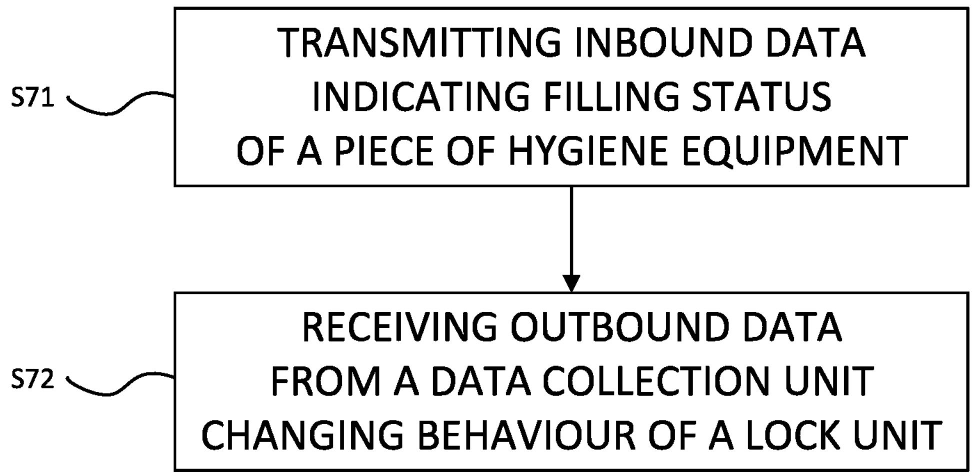

FIGS. 6 & 7 show schematic flow charts of respective general method embodiments of the present invention.

DETAILED DESCRIPTION

Figure 1A:
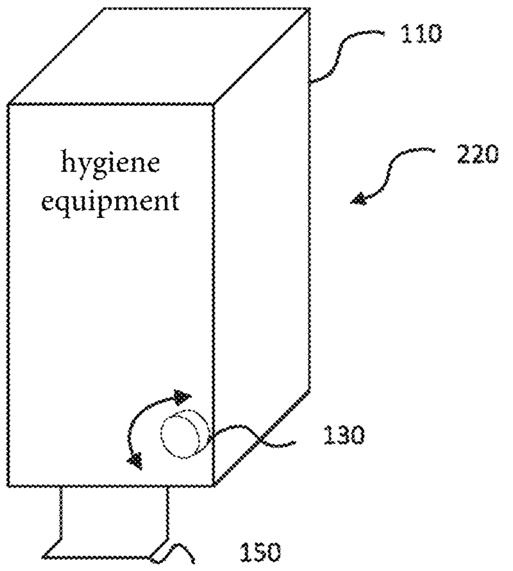
FIGS. 1A and 1B show a piece of hygiene equipment according to an embodiment.
Figure 1B:
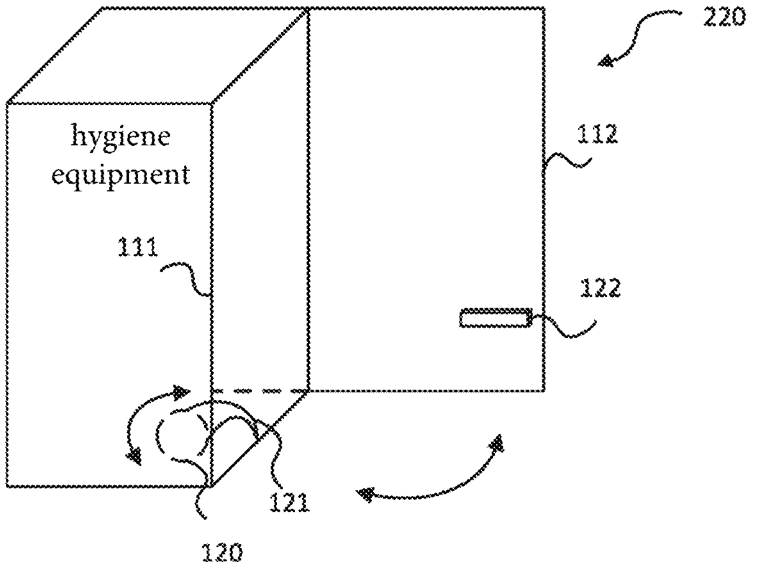

FIGS. 1A and 1B show a piece of hygiene equipment according to an embodiment of the present invention. The piece of hygiene equipment may be any kind of dispenser which can be in the form of a holder for paper towels, a holder for toilet paper or a container for liquid soap. Other types of dispensers, for example waste bins, may be also used. FIG. 1A shows a piece of hygiene equipment or dispenser 220 which comprises a housing 110 having an interior volume for holding a hygiene product. In FIG. 1A, the hygiene equipment 220 holds a consumable product, like soap, disinfectant, paper towels, and the like. In the example shown, a paper towel 150 can be drawn from a dispenser (as a piece of hygiene equipment). However, the hygiene equipment 220 may be also designed differently holding other types of consumable products.

As further shown in FIG. 1B, the hygiene equipment housing 110 of the hygiene equipment 220 may have a fixed part 111 and an openable part 112 which is movable or removable with respect to the fixed part 111 (possible movements shown with arrow) to provide access to the interior volume. In addition and as also shown in FIG. 1B, the hygiene equipment 220 may comprise a lock unit 120 placed inside of the hygiene equipment 220 and configured to lock the openable part 112 to the fixed part 111 of the hygiene equipment 220 or unlock the openable part 112 from the fixed part 111 of the hygiene equipment 220.

For example, the lock unit 120 comprises a hook or latch 121 which is rotatable (rotation shown with arrow). The hook 121 can engage a counterpart 122 placed on the openable part 112 such that the openable part 112 is not movable with respect to the fixed part 111. Instead of a rotatable hook 121, any other hook or agile latch can be used which is capable of engaging a counterpart. A magnet may be placed on the openable part 112 to keep the openable part 112 in contact with the fixed part 111 even when the hook or agile latch is not engaging the counterpart. When the hook 121 does not engage the counterpart 122, the openable part 112 is movable with respect to the fixed part 111. Thus, the interior of the hygiene equipment 220 can be accessed and the products held by the housing 110 can be refilled or emptied.

Outside of the housing 110, a rotatable button 130 or any other rotatable unit (see FIG. 1A) may be positioned which, when being rotated, rotates the hook 121 of the lock unit 120 inside of the housing 110. Thus, when the cleaning staff, janitor, or any other person needs to access the interior of the hygiene equipment 220, the cleaning staff, janitor, or the like can turn the button 130 until the hook 121 inside of the hygiene equipment 220 does not engage the counterpart 122. Instead of a rotatable button 130, any other unit can be installed which, when being pushed, pulled, pressed or the like can move the hook 121 or any other agile latch in such a way that it does not engage the counterpart 122.

In order to avoid that an unauthorized person opens the hygiene equipment 220 and has access to the products stored within the hygiene equipment 220, the openable part 112 can be locked to the fixed part 111 of the hygiene equipment 220. In other words, when the lock unit 120 is in a locking state, the openable part 112 is locked to the fixed part 111 and an unauthorized person cannot move the openable part 112 from the fixed part 111 to access the hygiene equipment 220. The openable part 112 can be moved with respect to the fixed part 111 when the lock unit 120 is in an unlocking state.

For example, in the locking state, the lock unit 120 may block the movement of the hook 121, while in the unlocking state, the lock unit 120 may not block the movement of the hook 121. When the movement of the hook 121 is blocked, the hook 121 remains to be engaged with the counterpart 122. When the movement of the hook 121 is not blocked, the hook 121 can be moved to either engage the counterpart 122 or not to engage the counterpart 122.

For example, the lock unit 120 comprises a blocking member (not shown) movable between a blocking position in which it blocks the movement of the hook 121 and an unblocking position in which it allows movement of the hook 121. The lock unit 120 may further comprise an electric actuator (not shown), for example an electric motor or the like, which may be arranged for moving the blocking member between the blocking position and the unblocking position. The lock unit 120 may further comprise an interface for receiving data that determines and/or changes the behaviour of the lock unit as described in greater detail in conjunction with the respective embodiments as part of the present disclosure.

Figure 2:
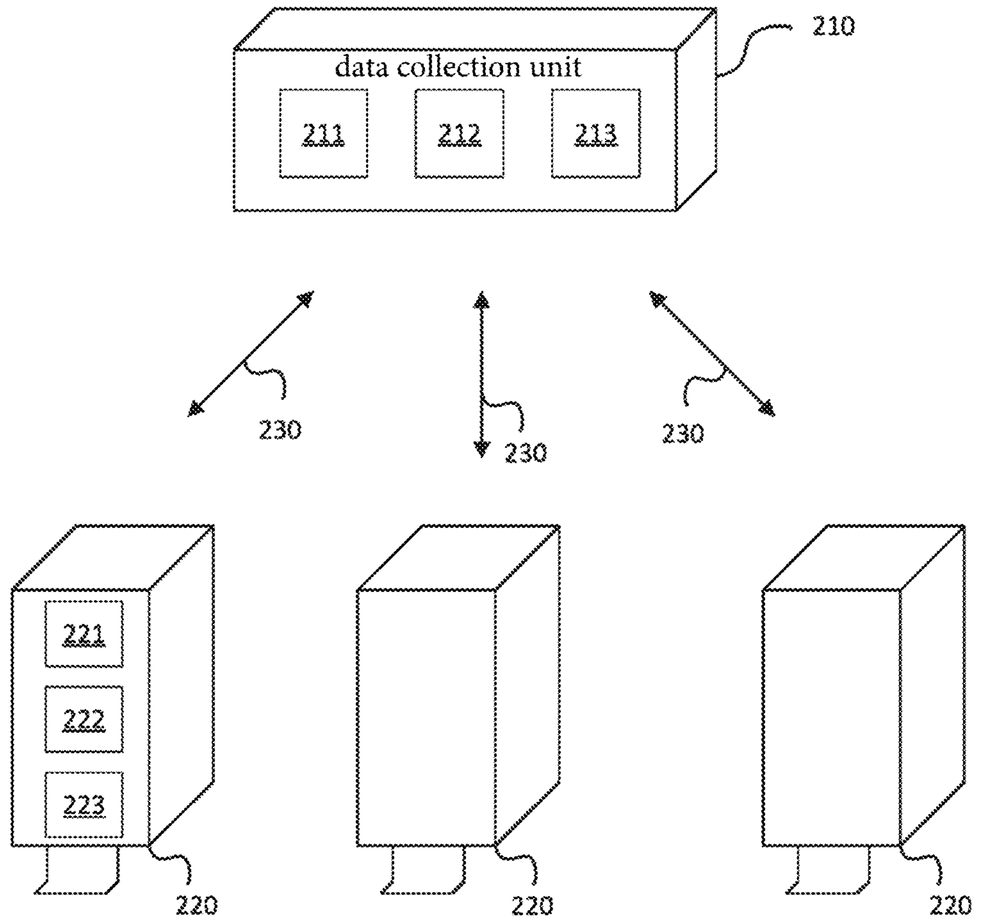
FIG. 2 shows a system comprising pieces of hygiene equipment and a data collection unit according to an embodiment.

FIG. 2 shows a system comprising pieces of hygiene equipment and a data collection unit according to an embodiment. The pieces of hygiene equipment 220 may be the hygiene equipment as described with regard to FIG. 1A and/or 1B. The pieces of hygiene equipment 220 may each comprise a housing having an interior volume for holding a hygiene equipment product, wherein the hygiene equipment housing may have a fixed part and an openable part which is movable or removable with respect to the fixed part to provide access to the interior volume (see also FIG. 1). The interior volume may be refilled or emptied with consumable products, like paper towels, toilet paper, liquid soap, or the like.

The pieces of hygiene equipment 220 may each further comprise a sensor unit 221 and a lock unit 222, wherein the latter locks, in a locking state, the openable part to the fixed part of the hygiene equipment or unlocks, in an unlocking state, the openable part from the fixed part of the hygiene equipment. The locking and unlocking state have been described in detail with regard to FIG. 1. The lock unit 222 may be an electrical lock having mechanical parts and electrical parts. For the mechanical parts and the electrical parts, it is referred to the description given with regard to FIGS. 1A and 1B. Thus, a detailed description it omitted at this point.

Each unit 221, 222 of a piece of hygiene equipment 220 may comprise a transmitting unit which may respectively transmit data indicating a filling status of the hygiene equipment 220 to a data collection unit 210 and a receiving unit which may receive data from the data collection unit 210. Alternatively, each unit 221, 222 may comprise a transceiver, a unit that can perform both transmitting and receiving tasks. Some received data may change a behaviour with regard to the lock unit 222 of the hygiene equipment 220 based on, for example, the filling status of the hygiene equipment.

In general, the term filling status defines any information that can inform another entity on how much consumable is left in the piece of hygiene equipment and/or whether or not a refill is or is becoming necessary or recommendable. For example, the filling status may consist of or comprise information on a filling level against some predefined scale (e.g. 0 . . . 100%, 0.0 . . . 1.0, 0 . . . 10, 0 ml . . . 500 ml or any other applicable maximum level, 0 pcs . . . 100 pcs. or any other applicable maximum level, and the like). Likewise, the filling status may also be more abstract in that it indicates a mere status and only conveys the information whether or not a refill is necessary or recommended. For example, the filling status may assume a first value indicating that no refill is necessary or recommended (i.e. all OK, e.g. 0), and a different second value indicating that a refill is necessary or recommended (e.g. 1). In another embodiment, no information on a refill status may indicate that no refill is necessary or recommended, whereas the mere fact that the filling status is received indicates that a refill is necessary or recommended. The refill status information may be compared against applicable thresholds as described elsewhere in the present disclosure (e.g. 20%, 0.2, 200 ml, 1, etc. . . . ).

In general, the mentioned behaviour with regard to a lock unit of hygiene equipment can be understood as a changeable property, characteristic or parameter of, present inside, or associated to the lock unit that indicates a “readiness” to unlock. In some embodiments, a first behaviour may be associated with a lower or even no readiness to unlock: In such a state it is not considered that the lock unit will be opened. This may be, for example, the case when there is enough consumable in the hygiene equipment and it is (presently) not considered that a refill needs to be exchanged and, for this, in turn, the hygiene equipment needs to be opened, and, for this, in turn, the lock unit shall unlock. On the other hand, a second behaviour may be associated with a higher readiness to unlock: In such a state it is considered that the lock unit will be opened. This may be, for example, the case when the consumable in the hygiene equipment has run low and it is imminent that a refill needs to be exchanged and, for this, in turn, the hygiene equipment needs to be opened, and, for this, in turn, the lock unit shall unlock. In one embodiment, the first behaviour is associated with reduced awareness for receiving an unlocking command (because it is not expected in this state), and the second behaviour is associated with an increased awareness for receiving an unlocking command (because it is expected in this state). In the latter second behaviour, there may be any one of an increased frequency to listen to/receive an opening/unlock command, a higher repetition rate for polling whether or not such an opening/unlock command is present, and an increased number of channels for receiving such an opening/unlock command (for example, an additional local channel/interface is activated over which an opening/unlock command can be received).

The data collection unit 210 may comprise a receiving unit 211, a transmitting unit 212, and a processing unit 213. The data collection unit 210 may be arranged to collect data indicating hygiene equipment status from a plurality of pieces of hygiene equipment pieces 220. The data collection unit 210 may either be wirelessly or with wire connected to a single hygiene equipment piece 220 or to a plurality of hygiene equipment pieces 220 via links 230. In FIG. 2, the data collection unit 210 is connected to three pieces of hygiene equipment 220 via links 230 but this is not limiting. The data collection unit 210 may be connected to more or less hygiene equipment pieces 220.

According to an embodiment, the piece of hygiene equipment 220 may comprise a data acquisition unit which may acquire the filling status of the hygiene equipment 220. The data acquisition unit may be positioned in the housing of the hygiene equipment 220 and may form part of distributed data acquisition equipment. The data acquisition unit may be any type of distributed equipment, i.e. sensor types, and measure—respectively—towel-, tissue-, soap consumption-, filling levels, or number of usage with regard to the hygiene equipment 220.

The data generated by the hygiene equipment 220, for example by the data acquisition unit, may be collected by the data collection unit 210, like a gateway, which may be placed in the transmission range of the hygiene equipment 220, in particular of the data acquisition unit. The data collection unit 210 may interact with the data acquisition unit that act as data sources for data indicating hygiene equipment status. For example, the data collection unit 210 receives the data acquired by the data acquisition by, for example, a short-range wireless network (e.g. IrDA, IEEE802.15.4, Zigbee, RF4CE, SP100, IEEE802.il, Bluetooth™, Bluetooth Low Energy™, or similar technologies) that conveys the sensor data from the data acquisition unit to the data collection unit 210.

In a general sense, the data collection unit 210 may thus comprise the receiving unit 211 so that it is configured to receive inbound data from the hygiene equipment, wherein that inbound data indicates a filling status of the hygiene equipment acquired by the data acquisition unit of the hygiene equipment. The data collection unit 210 also comprises the processing unit 213 so that it is configured to initiate a command toward the hygiene equipment to change a behaviour of a lock unit of the hygiene equipment based on the filling status. In this way, a command that changes the behaviour can be initiated at the site of the data collection unit 210. This initiating of the command may comprise any one of evaluating the filling status, for example vis-à-vis a threshold, taking a decision whether or not the command shall be transmitted toward the hygiene equipment, compiling the command including for example putting together information units that are required for the command so that it can be understood by the hygiene equipment, fetching the command or parts thereof, and generating the command or parts thereof, including, for example, generating identifiers or keys. The data collection unit 210 further comprises the transmitting unit 212 that is configured to transmit the outbound data indicating the command to the hygiene equipment.

In a sense, said data collection unit 210 may collect data from one or more data acquisition units placed in one hygiene equipment piece 220 or placed in different hygiene equipment pieces 220 and forward it in bundled fashion to a next entity in the chain, for example, by means of employing an intermediate-range wireless network (e.g. WLAN, GSM, GPRS, UMTS, 3GPP, LTE or similar technologies). From there, the sensor data may be routed via one or more LAN(s) and/or the internet to a terminal or server. The terminal may be any type of user device or personal computing device such as smartphone, desktop computer, tablet, smart watch, laptop computer, or the like, and may display the data received from the entity.

Instead of transmitting the data from the data collection unit 210 to the terminal via the entity, the data may be also sent to the terminal via a Cloud system. A cleaning staff, janitor, or the like may monitor and check the filling status of each hygiene equipment piece 220 using the terminal. For example, colors are used by the terminal to indicate the filling status, wherein a red bar may indicate that the hygiene equipment piece 220 immediately needs to be refilled or emptied, a yellow bar may indicate that in the near future the hygiene equipment piece 220 needs to be refilled or emptied, and a green bar may indicate that the hygiene equipment piece 220 is fully filled or emptied and thus no refilling or emptying is needed. Thus, the cleaning staff, janitor, or the like may be warned by the terminal based on the filling status when refilling or emptying of a piece of hygiene equipment 220 is necessary.

In one embodiment, the initiating of the command comprises evaluating the filling status received from the hygiene equipment and, for example comparing it against a threshold value. Here, the decision can be taken whether or not the command shall be sent out toward the hygiene equipment if the received filling status indicates a level that is less than a threshold. As a consequence, the hygiene equipment can be instructed to poll more often for a potential opening command when the refill, or, generally, the level of the consumable, has run low. The increased availability for unlocking is thus in response to the low filling level and the higher likelihood for an exchange of the refill, and, with the latter, the higher likelihood for a request to open the hygiene equipment.

For example, one or more thresholds can be set at the time of manufacturing and/or releasing to the market the data collection unit 210. In such an embodiment, the data collection unit 210 may store a list for several types of pieces of hygiene equipment and/or several types of refills, which can be indicated, for example in the form of an identifier, from the hygiene equipment to the data collection unit together or following the filling status. The one or more thresholds can also be set or updated via any entity higher up in the information hierarchy, such as by a server or service in the Internet or Cloud to which the data collection unit reports to. Likewise, the one or more thresholds can be set locally via an interface of the data collection unit (e.g. local Bluetooth or other wireless communication interface, wired interface, programming interface, DIL-switches, etc.). In the latter example, the one or more thresholds can be set at installation, wherein the terminal indicates that the hygiene equipment piece 220 needs to be refilled when the filling status of the hygiene equipment piece 220 is below a threshold level. The terminal may indicate that the hygiene equipment piece 220 needs to be emptied when the filling status of the hygiene equipment piece 220 is above a threshold level. Changes or customization of threshold levels may be also done at any time by a system administrator or any other person being responsible for the hygiene equipment pieces.

Inbound data may indicate a filling status of the hygiene equipment 220 acquired by a data acquisition unit (sensor unit 221) of the hygiene equipment 220. Generally in the present disclosure, it is referred to inbound data as seen from a server or intermediate entity, such as data collection unit, i.e. this inbound data is received by the server or the data collection unit from hygiene equipment. On the other hand, outbound data is transmitted from the server or data collection unit to the hygiene equipment. As explained above, the data collection unit 210 may receive the inbound data via link 230 of a short-range wireless network (e.g. IrDA, IEEE802.15.4, Zigbee, RF4CE, SP100, IEEE802.il, Bluetooth™, Bluetooth Low Energy™, or similar technologies). The data communication between the data collection unit 210 and the hygiene equipment 220, in particular between the data collection unit 210 and the data acquisition unit of the hygiene equipment 220, may be facilitated by 2.4 GHz radio and a unique communication protocol. Since the data collection unit 210 may be powered by electrical mains, the data collection unit 210 may always be ready to receive inbound data acquired by the data acquisition unit. Since the data acquisition unit and the hygiene equipment 220, in particular, the transmitting unit 222 of the hygiene equipment 220, may be powered by small batteries, the transmitting unit 222 may transmit the data with low frequency or low occurrence rate in order to prolong the battery life of the hygiene equipment battery.

In order to further prolong the battery life of the hygiene equipment battery, the transmitting unit 222 of the hygiene equipment 220 may transmit the inbound data to the data collection unit 210 according to a specific time interval and the receiving unit 211 of the data collection unit 210 may receive the inbound data from the hygiene equipment 220 according to the specific time interval. For example, in order to save battery power, the hygiene equipment 220 may not continuously send or transmit inbound data to the data collection unit 210 but may do so according to a specific time interval, for example, every fourth minute. The specific time interval may be stored in the hygiene equipment 220, for example in a storing unit of the hygiene equipment 220, during manufacturing or installation.

It is also possible that, for example, the data collection unit 210, before starting to receive the inbound data from the hygiene equipment 220 of after having received the first inbound data from the hygiene equipment 220, sends data to the hygiene equipment 220 to inform the hygiene equipment 220 when and/or how often the hygiene equipment 220 should transmit the inbound data. According to another embodiment, it is also possible that the hygiene equipment 220, before starting to transmit the inbound data or when transmitting the inbound data the first time, sends data to the data collection unit 210 to inform the data collection unit 210 when and/or how often the hygiene equipment 220 will send the inbound data. The data collection unit 210 and the hygiene equipment 220 may also agree on a radio frequency for communication, for example 2.4 GHz radio.

The data collection unit 210 may further comprise a transmitting unit 212 which may send or transmit outbound data to the hygiene equipment 220, the outbound data changing a behaviour with regard to a lock unit 222 of the hygiene equipment 220 based on the filling status of the hygiene equipment 220. Respective details are described especially in conjunction with FIGS. 3A through 3D. The outbound data may be received by the receiving unit 223 of the hygiene equipment 220. The outbound data may comprise instructions to change the behaviour with regard to the lock unit 222. However, it is also possible that the outbound data may be processed in the hygiene equipment by, for example, a processing unit (not shown), which may create the instructions to change the behaviour with regard to the lock unit 222.

According to an embodiment, the behaviour with regard to the lock unit 222 of the hygiene equipment 220 may be changed when the filling status of the hygiene equipment 220 indicates that the hygiene equipment 220 needs to be refilled or emptied. For example, when the hygiene equipment 220 is a dispenser storing paper towels, liquid soap, or toilet paper, the hygiene equipment 220 needs to be refilled when the paper towels, liquid soap, and toilet paper have been consumed. For example, when the hygiene equipment 220 is a waste bin or the like, the hygiene equipment 220 needs to be emptied when the waste bin is full. The refilling or emptying may be performed by a cleaning staff, janitor, or the like.

According to an embodiment, the behaviour with regard to the lock unit 222 of the hygiene equipment 220 may be directed to a communication mode of the hygiene equipment 220. The communication mode of the hygiene equipment 220 may be a mode when the hygiene equipment 220 communicates with the data collection unit 210 via links 230. The communication mode may define the settings necessary for correct communication between the hygiene equipment 220 and the data collection unit 210. For example, the communication mode defines the radio frequency for communication, time and duration for the communication, and the like.

For example, the behaviour comprises a receiving and/or transmitting characteristic, wherein the receiving and/or transmitting characteristic indicates a radio scheme to be used by the hygiene equipment for communication and/or an occurrence rate with which the hygiene equipment 220 enters a receiving mode to receive incoming data.

The receiving or transmitting characteristic may be characteristics or settings when the hygiene equipment listens for data or signals or receives data or signals transmitted from another device to the hygiene equipment and/or characteristics or settings when the hygiene equipment transmits data or signals to another device. When no occurrence rate has been agreed with the other device, the hygiene equipment may only listen for data or signals for a short period of time in order to reduce battery consumption.

The radio scheme may comprise a radio frequency, bandwidth, protocol, standard, channel settings and the like for enabling the hygiene equipment to communicate with the data collection unit, another device, server, or the like. For example, the radio scheme is selected from any one of Bluetooth, Bluetooth Low Energy, Zigbee, WLAN, LTE, or similar technologies. For Bluetooth, Bluetooth Low Energy, or the like the hygiene equipment and/or the data collection unit may be pre-paired with another device before starting communication with this device.

For example, when the filling status indicates that the hygiene equipment 220 needs to be refilled or emptied, the radio frequency or bandwidth with regard to the lock is changed. This may mean that the hygiene equipment 220 switches to a radio frequency or specific bandwidth to receive incoming data from, for example, an external device or the data collection unit 210.

According to another example, when the filling status indicates that the hygiene equipment 220 needs to be refilled or emptied, the hygiene equipment 220 may switch to a radio frequency or specific bandwidth to transmit data to, for example, the data collection unit 210. For example, the hygiene equipment 220 switches to a polling frequency to transmit polling data to the data collection unit 210 in order to request the data collection unit 210 to transmit data to the hygiene equipment 220. Further details about the polling of data are provided elsewhere in the present disclosure.

According to another example, when the filling status indicates that the hygiene equipment 220 needs to be refilled or emptied, the hygiene equipment 220 may switch to a protocol, standard, or the like in order to receive and/or transmit data from/to the data collection unit 210. For example, the hygiene equipment 220 switches to Bluetooth, Bluetooth Low Energy, WLAN, or the like when the hygiene equipment 220 needs to be refilled or emptied.

According to another example, when the filling status indicates that the hygiene equipment 220 needs to be refilled or emptied, the occurrence rate with which the hygiene equipment 220 enters a receiving mode to receive incoming data from, for example, the data collection unit 210 is changed. In a receiving mode, the receiving unit 223 of the hygiene equipment 220 may be active to receive incoming data. The occurrence rate may be in the sense of a frequency or repetition rate. With the occurrence rate, a frequency that the hygiene equipment 220 is in the receiving mode to receive incoming data may be provided, wherein in this case the frequency may indicate how many times the hygiene equipment 220 is in the receiving mode to receive incoming data. For example, the occurrence rate indicates that the hygiene equipment 220 is in the receiving mode five times per hour, wherein the time intervals in which the hygiene equipment 220 is not in the receiving mode may be equally long or may differ. Thus, the hygiene equipment 220 may enter the receiving mode periodically or aperiodically.

According to another embodiment, the occurrence rate may indicate how many times the hygiene equipment 220 transmits polling data to the data collection unit 210, wherein the hygiene equipment 220 may be in the receiving mode directly after having transmitted the polling data in order to receive an answer from the data collection unit 210 in response to the polling data. Further details about the polling of data are provided elsewhere in the present disclosure.

As explained above, the incoming data may be transmitted from the data collection unit 210. The incoming data may be a lock signal or an unlock signal that is transmitted to the hygiene equipment 220. When the hygiene equipment receives the unlock signal, the lock unit of the hygiene equipment 220 changes to the unlocking state. The unlocking state has been described above and means that the mechanical parts of the lock unit 222 are not blocked and a person can move the openable part of the hygiene equipment 220 from the fixed part of the hygiene equipment 220 to open the hygiene equipment 220 for refilling or emptying. When the hygiene equipment receives the lock signal, the lock unit of the hygiene equipment 220 changes to the locking state. The locking state has been described above and means that the mechanical parts of the lock unit 222 are blocked and the cleaning staff or janitor cannot move the openable part of the hygiene equipment 220 from the fixed part of the hygiene equipment 220 to open the hygiene equipment 220. In other words, the hygiene equipment 220 remains locked.

Figure 3A:
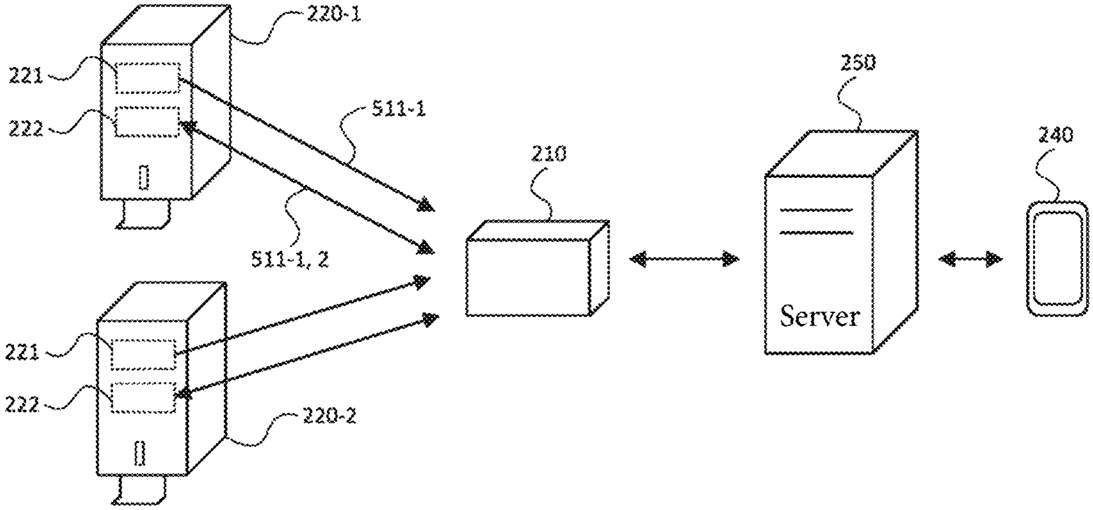
FIGS. 3A to 3D show schematic views of use cases and device configurations according to respective embodiments of the present invention.

FIGS. 3A to 3D show schematic views of use cases and device configurations according to respective embodiments of the present invention. In FIG. 3A a first such configuration is schematically shown, in which the configuration comprises at least a number of pieces of hygiene equipment 220-1, 220-2, e.g. dispensers, a data collection unit 210 and a communication toward a server 250 (e.g. over the Internet to a server or cloud data storage and processing resource).

Specifically, the pieces of hygiene equipment 220 transmit messages toward the data collection unit 210 in more or less regular intervals at some predetermined or set occurrence rate:

The sensor unit 221 of dispenser 220-1 transmits messages 511-1 toward the data collection unit 210 conveying information in relation to a filling status of the piece of hygiene equipment. Similarly, the lock unit 222 of dispenser 220-1 transmits messages 512-1 toward the data collection unit 210 conveying a request for any information as part of a polling operation, i.e. a first transmission toward the data collection unit 210 as part of 512-1 may be followed by a transmission from the data collection unit 210 toward the dispenser 220-1. In other words, refill sensors and locks send data to the data collection unit as gateway according to time intervals stored in the sensors (e.g. every 4th minute). This data communication can be facilitated by 2.4 GHz radio and a standard or proprietary communication protocol (e.g. Zig-bee or based thereon).

The data collection unit 210 then reports (521) to the server 250 which implements a function for data processing, management and rendering the respective decision. It may be provided that the gateway 210 checks if new data from the sensors differ from previously sent data and only if there is a difference the new data will be transmitted to server 250. This data communication can be facilitated e.g. by telecom networks like 2G, 3G and 4G, 5G, and the like. The server 250 evaluates the sensor data and depending on refill data threshold values stored in the server, a status level for the refill can be established. Optionally, an operator can see the status levels by a mobile device 240 or via Internet. In one embodiment, the server 250 can distinguish between status levels that correspond to full (or no refill needed) and "empty" or "low" (corresponding to refilling possible and/or recommended) in relation to the consumable and, in relation to the lock unit, between at least a lock status "locked" and "unlocked".

When status level corresponds to "full" then it can be determined that no refill is necessary, and thus no access to the internals of the piece of hygiene equipment. This, in turn, corresponds to a request or a requirement to a locked state. However, if the status level is indicating "refilling possible" or "empty", then an unlocking request is established. In this situation, the server 250 informs the data collection unit 210 so that it can react accordingly. The lock or unlock request is transmitted from the server 250 to the gateway 210 and it can be considered to transmit only changes in the lock requests. Specifically, next time the lock unit 222 transmits its status or polling request 512-2, the data collection unit 210 can execute the change from a locking to a or unlock request and can send back a corresponding command as part of the transmission toward the piece of hygiene equipment in response to the polling.

Figure 3B:
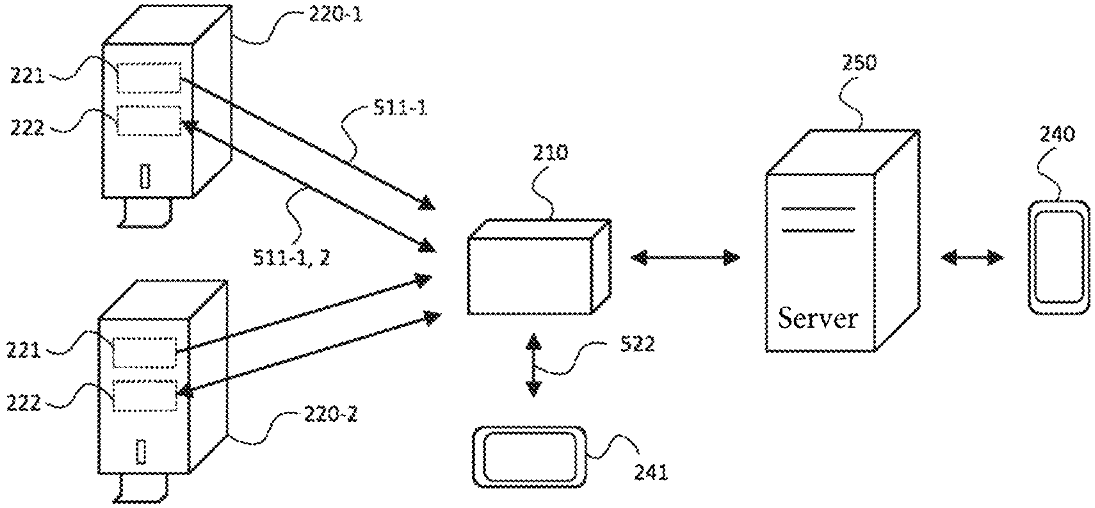

In FIG. 3B a second such configuration is schematically shown, in which the configuration comprises again at least a number of pieces of hygiene equipment 220-1, 220-2, e.g. dispensers, a data collection unit 210 and a communication toward a server 250. The first part of the procedures is identical or similar to those as described in conjunction with FIG. 3A. However, once the server 250 decides that a change in a lock status for one or more dispensers is needed, no direct changeover to an unlocked open state is performed, but only a change in the occurrence rate at which the lock unit 222 performs polling. Specifically, the dispenser 220-1 and the gateway 210 perform a communication 512-2' in the next iteration, in which the lock unit 222 is told to increase the occurrence rate, i.e. to poll for information from the data collection unit 210 more often. For example, when an initial normal occurrence rate is about every $4^{th}$ minute, the occurrence rate can be changed to every 15 seconds by means of the communication 512-2. In summary, a dispenser with a need for a refill does not immediately unlock but polls for information and an (eventual) unlock command from the gateway 210 more often.

In this state an operator (janitor, member of cleaning/servicing staff) may approach the data collection unit 210 and may affect direct communication 522 with a mobile device 241 or, generally, a key device. In this way, a direct communication, relatively low-range, can be performed between a key or mobile device and the gateway 210 (e.g. via Bluetooth, BLE, RF-ID, NFC, etc.). This communication may then initiate the gateway 210 to issue an eventual unlock command toward the respective dispenser 220-1 in a communication 512-3.

In other words, the gateway 210 can also receive signals via e.g. Bluetooth signals from mobile devices that have been paired in an authorization routine in the system set up phase. So when the cleaner who is authorized get close enough to the gateway 210, the cleaner's mobile device 241 is registered by the gateway 210, and the data collection unit 210 and the lock unit 222 exchange data 512-3 sooner than before (due to the higher occurrence rate). The detection of the cleaner's mobile device 241 will thus trigger the gateway 210 to deliver an unlock command to the lock unit 222 at the next data exchange.

Figure 3C:
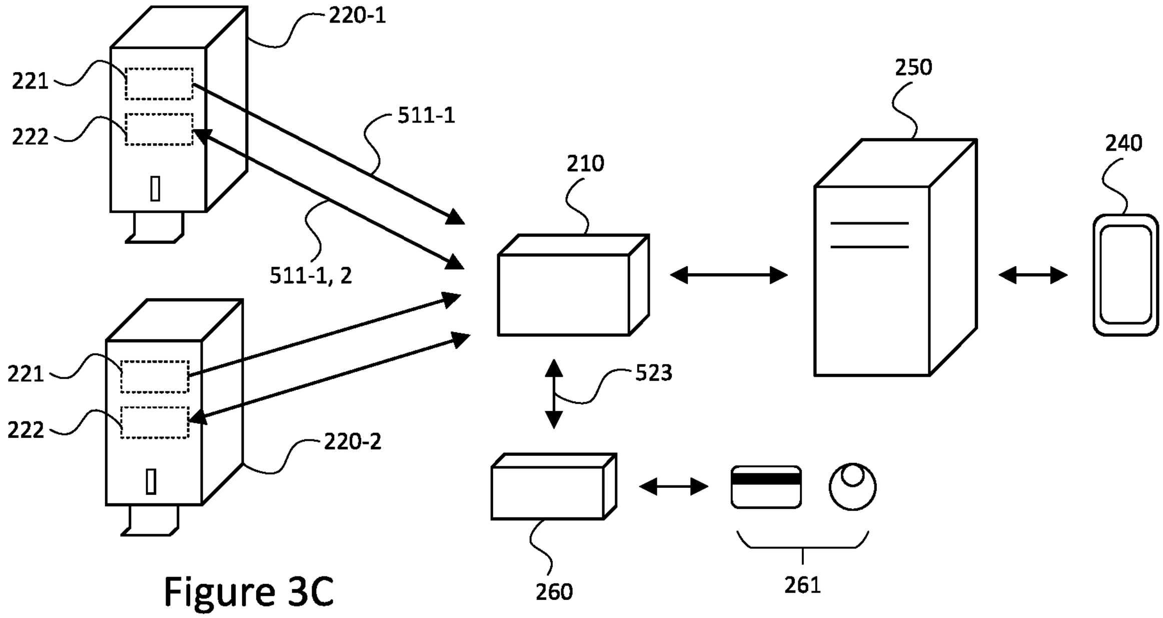

In FIG. 3C a third such configuration is schematically shown, in which the configuration comprises again at least a number of pieces of hygiene equipment 220-1, 220-2, e.g. dispensers, a data collection unit 210 and a communication toward a server 250. The first part of the procedures is identical or similar to those as described in conjunction with FIGS. 3A and 3B. Again, once the server 250 decides that a change in a lock status for one or more dispensers is needed, no direct changeover to an unlocked open state is performed, but only a change in the occurrence rate at which the lock unit 222 performs polling (see above). The gateway 210 can also receive Bluetooth or other wireless signals from a digital key reader device 260 that have been installed in the system set up phase. So when the cleaner who is authorized comes to this digital key reader device 260, he/she can announce his/her presence by swiping a digital key 261, for example a card 261 or bring close an RF-ID tag 261.

In this state, the data collection unit 210 and the lock unit 222 are now exchanging data 512-3 sooner and the detection of the cleaner and/or the authorization by means of a digital key 261 will trigger the data collection unit 210 to deliver an unlock command to the lock at the next data exchange.

Figure 3D:
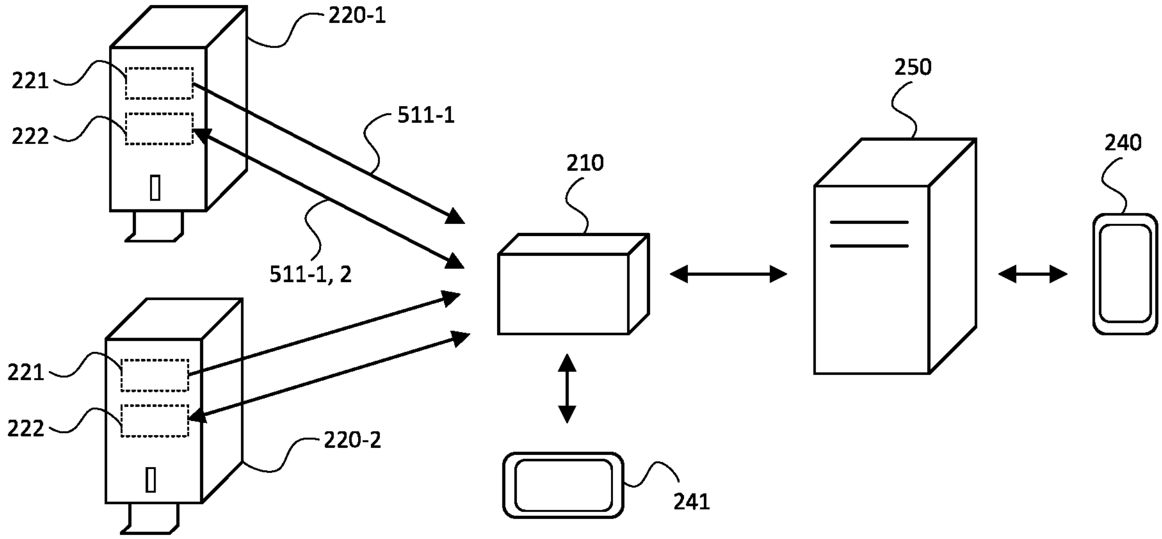

In FIG. 3D an additional but optional configuration is schematically shown that is based on any configuration as shown and explained in conjunction with FIGS. 3A, 3B, and 3C. This configuration can be part of an emergency or master routine that allows an unlocking of one or more dispensers 220 independent from any filling status. Namely, a computing or mobile device 240 can initiate this procedure via server 250 or another mobile device 241 may communicate for this purpose directly with the data collection unit 210. In response to such a procedure, the data collection unit 210 may effect another communication 512-4 so as to immediately, or at the moment of a next data exchange with the hygiene equipment, unlock a lock unit (e.g. unit 222 of dispenser 220-1).

In this way, such an action can be initiated by the cleaner or a facility manager, so as to unlock and open any given piece of hygiene equipment. It may be slower due to the non accelerated communication frequency (occurrence rate) between lock units and the gateway. However, one or more dispensers can be unlocked at the same time depending on design of application in mobile device. This command may thus override the automatic system described in conjunction with other use cases.

Figure 4:
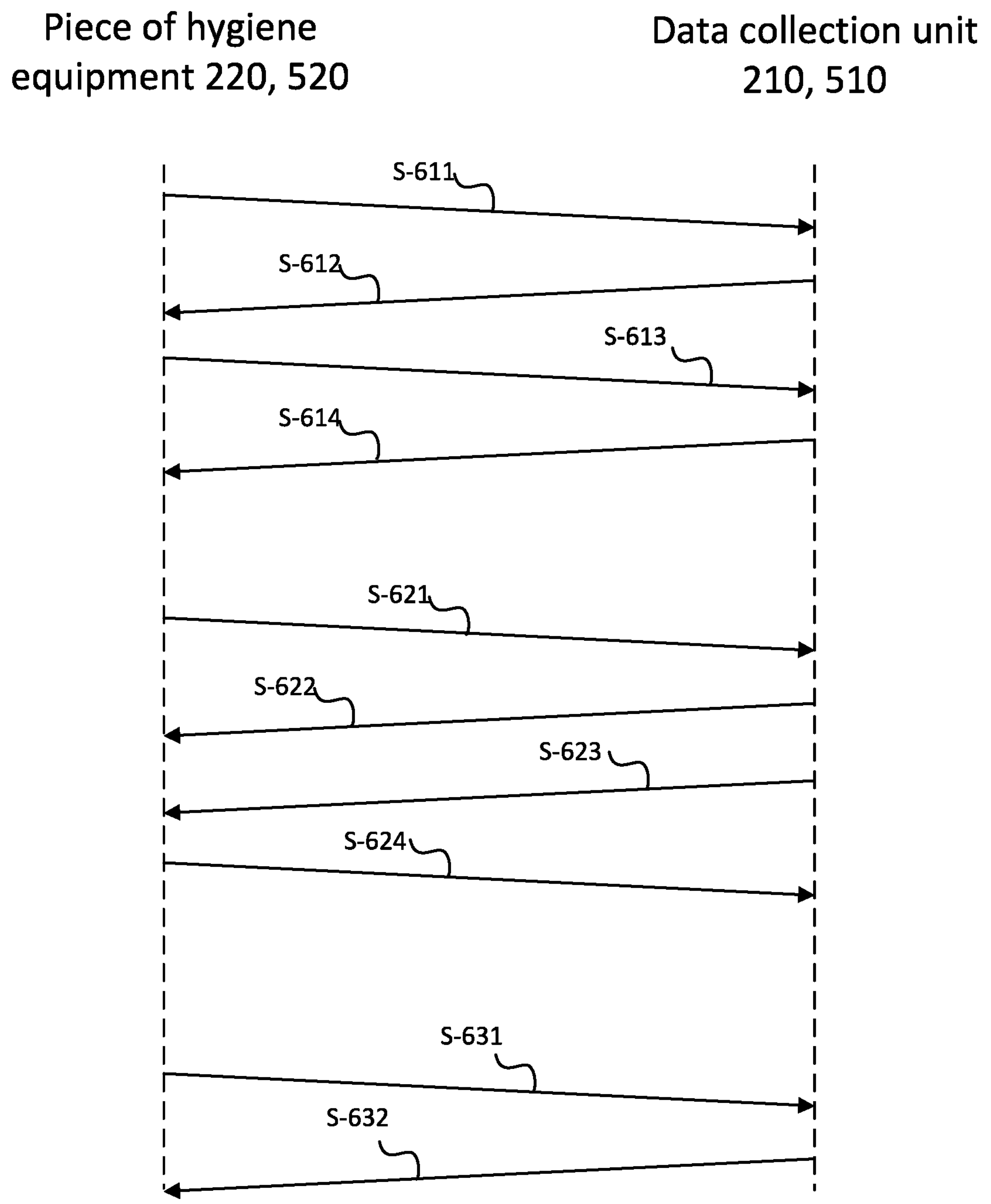
FIG. 4 shows an exemplary communication between a piece of hygiene equipment and a data collection unit.

FIG. 4 shows an exemplary communication between a piece of hygiene equipment and a data collection unit. The piece of hygiene equipment and the data collection unit may be similar to the pieces of hygiene equipment 220, 520 and the data collection units 210, 510 described above. As shown in FIG. 4, the piece of hygiene equipment 220, 520 may send in step S-611 a message to the data collection unit 210, 510. The message may comprise a header or address part and a payload data part, wherein the header or address part may comprise the source address and the destination address of the message. The payload data part comprises the actual data to be sent to the data collection unit 210, 510. For example, in step S-611, the piece of hygiene equipment 220, 520 may transmit status acceleration to set the occurrence rate, i.e. the occurrence rate for transmission, wherein the occurrence rate indicates how many times the piece of hygiene equipment 220, 520 transmits messages to the data collection unit 210, 510. For example, the piece of hygiene equipment 220, 520 communicates to the data collection unit 210, 510 that the piece of hygiene equipment 220, 520 transmits messages every eight minutes.

Some bits of the payload data part may be used for indicating a type of data sent to the data collection unit 210, 510, a log interval, a sensor software version of the sensors used within the piece of hygiene equipment 220, 520, a lock status, a battery voltage, the filling status of the piece of hygiene equipment, or the like. The lock status may indicate whether the piece of hygiene equipment 220, 520 is in a locking or unlocking state. With the type of data, it may be indicated that the message comprises polling data, the polling data requesting the data collection unit 210, 510 to respond to the piece of hygiene equipment 220, 520.

In step S-612, the data collection unit 210, 510 may transmit a data acknowledgment (ACK) to the piece of hygiene equipment 220, 520 to indicate that the data collection unit 210, 510 has successfully received the message from the piece of hygiene equipment 220, 520. The data ACK may comprise a frame pending equal to 0 indicating that no further messages will be transmitted by the data collection unit 210, 510 to the piece of hygiene equipment 220, 520. The data collection unit 210, 510 may further transmit lock or unlock data to the piece of hygiene equipment 220, 520 for locking or unlocking the piece of hygiene equipment 220, 520. As the hygiene equipment 220, 520 is in the receiving mode for a short period of time after having transmitted the message in step S-611, the piece of hygiene equipment is able to receive the data ACK. After having received the data ACK, the piece of hygiene equipment 220, 520 becomes inactive, i.e. is not in the receiving mode anymore, to reduce battery consumption.

According to the set occurrence rate for transmission, the piece of hygiene equipment 220, 520 may transmit another message in step S-613, the message being similar to the message transmitted in step S-611. For example, when the occurrence rate for transmission has been set to eight minutes, the piece of hygiene equipment 220, 520 transmits messages in time intervals of eight minutes. Again, the data collection unit 210, 510 may respond with a data ACK in step S-614, wherein the frame pending is again equal to 0.

The communication between the piece of hygiene equipment 220, 520 and the data collection unit 210, 510 following steps S-611 to S-614 may be performed continuously. However, once the filling status transmitted in the messages by the piece of hygiene equipment 220, 520 indicates that the piece of hygiene equipment 220, 520 needs to be refilled or emptied, the communication between the piece of hygiene equipment 220, 520 and the data collection unit 210, 510 may change. The changed communication is indicated in steps S-621 to S-624.

In step S-621, the piece of hygiene equipment 220, 520 may send a message to the data collection unit 210, 510. The message is similar to the messages transmitted in steps S-611 and S-613. However, in step S-621, the message indicates that the piece of hygiene equipment 220, 520 needs to be refilled or emptied.

In step S-622, the data collection unit 210, 510 may respond with a data ACK to indicate that the message in S-621 has been successfully received. The frame pending of the message in S-622 is now equal to 1 to indicate that the piece of hygiene equipment 220, 520 should continue to be in the receiving mode as further data is transmitted from the data collection unit 210, 510 to the piece of hygiene equipment 220, 520.

In step S-623, the data collection unit 210, 510 may transmit a further message which comprises an updated occurrence rate. For example, the updated occurrence rate sets the occurrence rate for transmission to one minute. Once, the piece of hygiene equipment 220, 520 receives the message with the updated occurrence rate, it updates the occurrence rate for transmission and now transmits messages to the data collection unit 210, 510 in time intervals of one minute instead of eight minutes. Thus, because of the filling status, the behaviour of the piece of hygiene equipment 220, 520 has been changed. The piece of hygiene equipment 220, 520 may respond to the message of step S-623 with a data ACK in step S-624, the data ACK transmitted by the piece of hygiene equipment 220, 520 having a frame pending equal to 0.

In step S-631, the piece of hygiene equipment 220, 520 may transmit a message to the data collection unit 210, 510 in accordance with the updated occurrence rate of transmission. In step S-632, the data collection unit 210, 510 may respond with a data ACK of frame pending equal to 0.

As described above, the data collection unit 210, 510 may respond to the messages of the piece of hygiene equipment 220, 520 with a data ACK. The data ACK may further comprise lock data or unlock data for locking or unlocking the piece of hygiene equipment 220, 520.

By adapting the radio scheme and the occurrence rate when the hygiene equipment needs refilling or emptying, the battery life of the hygiene equipment battery can be prolonged. For example, by solely switching to a radio frequency to receive incoming data from the data collection unit or transmit data to the data collection unit when the hygiene equipment needs refilling or emptying, or by increasing the occurrence rate with which the hygiene equipment transmits polling data and/or enters the receiving mode when the hygiene equipment needs refilling or emptying, the battery life of the hygiene equipment battery can be prolonged. In addition, it can be successfully avoided that an unauthorized person has access to the products stored in the hygiene equipment and that the burden on the authorized person increases. For example, by keeping the receiving unit of the hygiene equipment inactive for a longer time when the hygiene equipment does not need to be refilled or emptied (indicating that currently an authorized person would not need to open the hygiene equipment), but by activating the receiving unit and/or transmitting unit of the hygiene equipment more frequently when the hygiene equipment needs to be refilled or emptied (indicating that soon an authorized person will approach the hygiene equipment for refilling or emptying), the hygiene equipment can be easily and quickly unlocked while still saving battery power.

As explained above, the behaviour with regard to the lock unit may be directed to a communication mode of the hygiene equipment and may comprise a receiving and/or transmitting characteristic, the receiving and/or transmitting characteristic enabling the hygiene equipment to receive and/or transmit data. According to another embodiment, the behaviour with regard to the lock unit of the hygiene equipment may comprise a locking state and an unlocking state of the lock unit. Instead of changing the communication mode of the hygiene equipment in response to the filling status indicating that the hygiene equipment needs to be refilled or emptied, the data collection unit may transmit outbound data to the hygiene equipment to switch from the locking state to the unlocking state. Thus, when the data collection unit detects that the hygiene equipment needs refilling or emptying, the openable part of the hygiene equipment may be immediately and automatically unlocked from the fixed part of the hygiene equipment, resulting in a decrease in signaling while increasing the usability of the hygiene equipment and the work efficiency of the authorized person.

Figure 5:
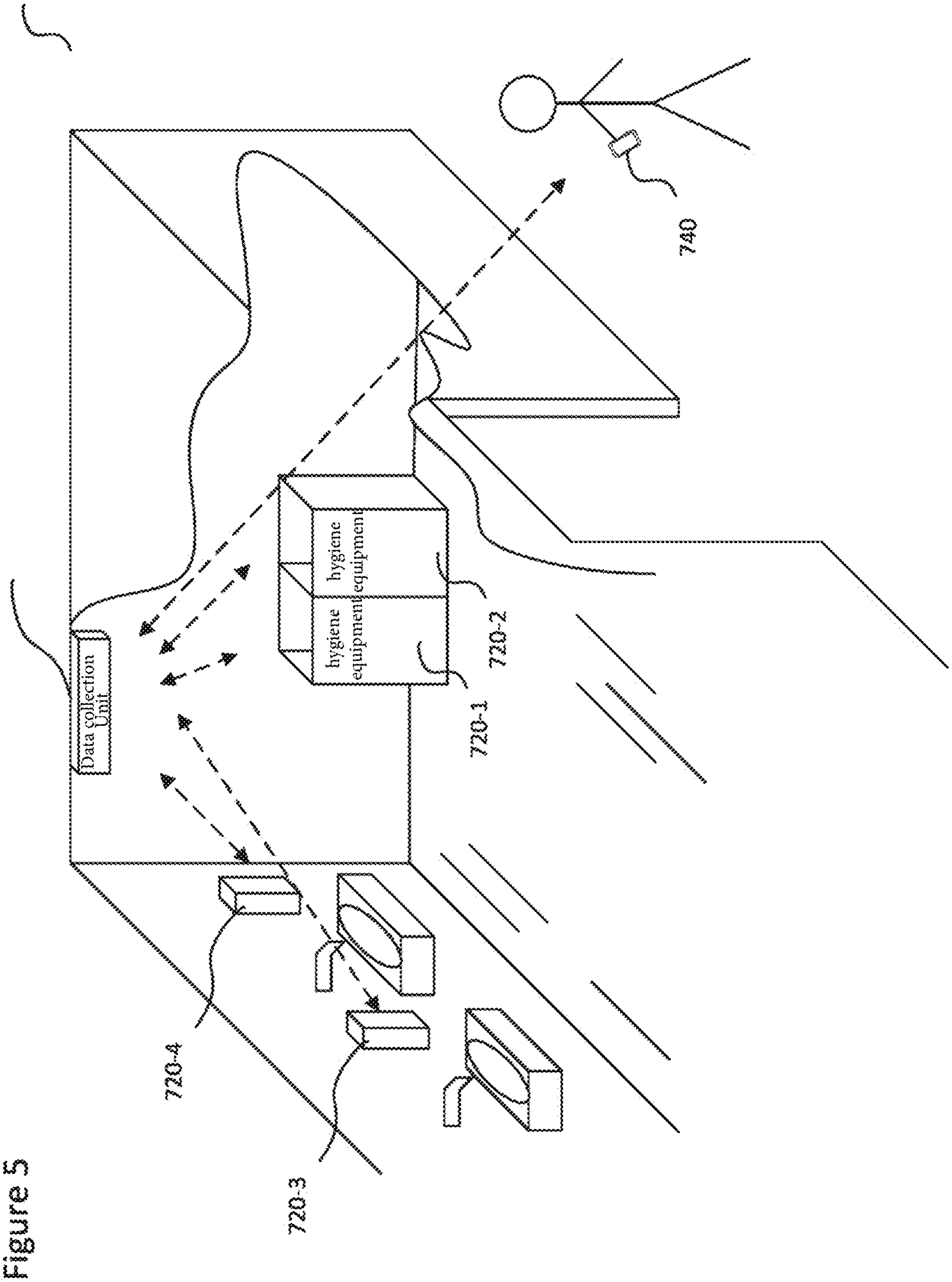
FIG. 5 shows an exemplary public facility comprising a data collection unit and pieces of hygiene equipment according to an embodiment.

FIG. 5 shows an exemplary public facility comprising a data collection unit and pieces of hygiene equipment according to an embodiment. The public facility 700 may be a washroom in a public building, an office, a restaurant, an airport, a hospital, a shopping mall or the like and may comprise several pieces of hygiene equipment 720-1, 720-2, 720-3, and 720-4. The pieces of hygiene equipment 720-1 and 720-2 may be waste bins which need to be emptied from time to time and the pieces of hygiene equipment 720-3 and 720-4 may be soap or towel dispensers which need to be refilled from time to time. The pieces of hygiene equipment 720-1, 720-2, 720-3, and 720-4 may be similar to the hygiene equipment described above with regard to FIGS. 1 to 6.

The public facility 700 may further comprise a data collection unit 710 which is installed on the ceiling of the public facility 700. The data collection unit 710, however, may be installed anywhere else as long as the data collection unit 710 can receive signals from every piece of hygiene equipment 720-1, 720-2, 720-3, and 720-4 installed in the public facility 700. The (bi-directional) communication between the data collection unit 710 and the pieces of hygiene equipment 720-1, 720-2, 720-3, and 720-4 is shown with dashed arrows.

Furthermore, FIG. 7 shows a person carrying an external device 740 which approaches the washroom. The person may be an authorized person, like a cleaning staff or janitor, carrying a smartphone. However, the person may also carry any other user terminal, like a mobile device, smart watch, tablet, tag, magnet card, RFID capable device, or the like. The (bi-directional) communication between the data collection unit 710 and the external device 740 is shown with a dashed arrow. The external device 740 may also bi-directionally communicate with the pieces of hygiene equipment 720-1, 720-2, 720-3, and 720-4 which is, however, not shown.

The data collection unit 710, the pieces of hygiene equipment 720-1, 720-2, 720-3, and 720-4, and the external device 740 may work together as explained above in order to avoid that an unauthorized person has access to the products stored in the pieces of hygiene equipment 720-1, 720-2, 720-3, and 720-4. Furthermore, by changing the behaviour of the lock unit of the hygiene equipment as explained above, the work load for the authorized person carrying the external device 740 can be decreased and the work efficiency/usability can be increased. In addition, the battery life of the batteries present in the pieces of hygiene equipment 720-1, 720-2, 720-3, and 720-4 can be prolonged. The batteries of the pieces of hygiene equipment 720-1, 720-2, 720-3, and 720-4 may power the transmitting unit of the hygiene equipment, the receiving unit of the hygiene equipment, the lock unit of the hygiene equipment, and/or the data acquisition unit of the hygiene equipment.

According to another embodiment, the transmitting unit of the piece of hygiene equipment as explained above may further transmit lock data from the lock unit, wherein the lock data may comprise status information of the lock unit and/or status information of one or more batteries powering the hygiene equipment. The receiving unit of the data collection unit as explained above may further receive the lock data from the lock unit of the hygiene equipment. The status information of the lock unit may indicate whether the lock unit is in a locking or unlocking state. For example, when the data collection unit detects that the lock unit of the hygiene equipment is in the unlocking state for a time period exceeding a threshold, the data collection unit may automatically transmit a lock signal to the lock unit such that the lock unit changes to the locking state. In this way, it is avoided that an unauthorized person has access to the products stored in the hygiene equipment because an authorized person has forgotten to lock the hygiene equipment.

Furthermore, by transmitting the status information of one or more batteries powering the hygiene equipment to the data collection unit, the data collection unit may be able to monitor the battery life of the hygiene equipment battery/batteries and send a signal either directly to the external device when the battery life is low or to a central service office having a server which then informs the external device that the battery life is low. There may be a single battery which powers the lock unit, the data acquisition unit, the transmitting unit and/or the receiving unit of the hygiene equipment or there may be a plurality of batteries in the hygiene equipment, wherein each unit in the hygiene equipment is powered by a specific battery of the plurality of batteries. For example, there is one battery powering the lock unit, another battery powering the data acquisition unit, another battery powering the transmitting unit, and another battery powering the receiving unit of the hygiene equipment. When the person carrying the external device is warned that the battery life is low, the person can change the corresponding battery, thus ensuring that the hygiene equipment works correctly. In a further embodiment, the detecting of a low power level in a lock battery can trigger an unlock request so the hygiene equipment will be accessible at any time regardless of fill status. The low power batter level may be indicated by a battery voltage falling below a preset threshold value.

According to another embodiment, the transmitting unit of the data collection unit as explained above may send or transmit outbound data to a plurality of pieces of hygiene equipment, wherein the outbound data may change behaviours with regard to a plurality of lock units of the plurality of pieces of hygiene equipment based on each filling status of each piece of hygiene equipment. Thus, a plurality of pieces of hygiene equipment can be locked or unlocked at the same time. For example, as shown in FIG. 7, when each of the pieces of hygiene equipment 720-1, 720-2, 720-3, and 720-4 needs to be refilled or emptied, the data collection unit 710 can unlock every piece of hygiene equipment 720-1, 720-2, 720-3, and 720-4 at the same time, decreasing the work load for the authorized person which needs to refill or empty the hygiene equipment.

According to another embodiment, when a piece of hygiene equipment is locked or unlocked using, for example, a signal, RFID capable device, electrical key, magnet card, or the like, the locked or unlocked piece of hygiene equipment may transmit a signal to another piece of hygiene equipment via device-to-device communication (Bluetooth or the like), wireless network (e.g. WLAN, GSM, GPRS, UMTS, 3GPP, LTE or similar technologies), etc. in order to automatically lock or unlock the other piece of hygiene equipment. In another case, the locked or unlocked piece of hygiene equipment may transmit a signal to the data collection unit via a wireless network or the like, wherein the data collection unit may automatically lock or unlock other pieces of hygiene equipment based on this signal.

In some conventional hygiene equipment (e.g. a dispenser) there are refill level sensors, i.e. a sensor that detects a level of a consumable. Such level sensors may be in the form of an option for those customers who want this feature. Such sensors may have a transmitter and a receiver or a so-called transceiver, a component that can make both functions. Some embodiments also address the situation in which an electronic lock is also an optional feature, so there can be offered dispensers with the lock or dispensers without the lock, but in this variant the dispenser can be prepared to be equipped later with an electronic lock in the form of a replacement or upgrade kit. A lock would also have both a receiver and a transmitter (or transceiver), so a dispenser may not have a common transmitter or receiver for both the lock and the level sensor. In a way, both the lock and the level sensors may thus have their own components for transmitting and receiving data. However, there are also embodiments in which a piece of hygiene equipment can have an electrical lock and a level sensor as a standard solution, i.e. from the point of shipment to the customer. Then, embodiments provide the advantage to reduce cost by having a common transceiver for both the lock and the refill sensor.

FIG. 6 shows a schematic flowchart of a general method embodiment of the present invention, which is a data collection method comprising a step S61 of receiving inbound data from a hygiene equipment, the inbound data indicating a filling status of the hygiene equipment acquired by a data acquisition unit of the hygiene equipment, and a step S62 of transmitting outbound data to the hygiene equipment, the outbound data changing a behaviour with regard to a lock unit of the hygiene equipment based on the filling status of the hygiene equipment.

FIG. 7 shows a schematic flowchart of a general method embodiment of the present invention which is a method for a piece of hygiene equipment, wherein the piece of hygiene equipment comprises a hygiene equipment housing having an interior volume for holding a hygiene equipment product, the hygiene equipment housing having a fixed part and an openable part which is movable or removable with respect to the fixed part to provide access to the interior volume, and a lock unit to lock the openable part to the fixed part of the hygiene equipment or unlock the openable part from the fixed part of the hygiene equipment. The method of this embodiment comprises a step S71 of transmitting inbound data indicating the filling status of the hygiene equipment to a data collection unit; and a step S72 of receiving outbound data from the data collection unit, the outbound data changing a behaviour with regard to the lock unit of the hygiene equipment based on the filling status of the hygiene equipment.

Although detailed embodiments have been described, these only serve to provide a better understanding of the invention defined by the independent claims and are not to be seen as limiting.

The invention claimed is:

1. A data collection method, comprising the steps of:
receiving inbound data from a hygiene equipment, the inbound data indicating a filling status of the hygiene equipment acquired by a data acquisition unit of the hygiene equipment; and
transmitting outbound data to the hygiene equipment, the outbound data changing a behaviour with regard to a lock unit of the hygiene equipment based on the filling status of the hygiene equipment.

2. The method according to claim 1, wherein the behaviour with regard to the lock unit of the hygiene equipment is changed when the filling status of the hygiene equipment indicates that the hygiene equipment needs to be refilled or emptied.

3. The method according to claim 1, wherein the behaviour with regard to the lock unit of the hygiene equipment is directed to a communication mode of the hygiene equipment.

4. The method according to claim 3, wherein the behaviour comprises a receiving and/or transmitting characteristic, the receiving and/or transmitting characteristic indicating a radio scheme to be used by the hygiene equipment for communication and/or an occurrence rate with which the hygiene equipment enters a receiving mode to receive incoming data.

5. The method according to claim 4, wherein the occurrence rate with which the hygiene equipment enters the receiving mode to receive the incoming data is increased when the filling status of the hygiene equipment indicates that the hygiene equipment needs to be refilled or emptied.

6. The method according to claim 1, wherein the behaviour with regard to the lock unit of the hygiene equipment comprises a locking state and unlocking state of the lock unit.

7. The method according to claim 1, wherein said outbound data carries a command and the method further comprises initiating of the command, including any one of evaluating the filling status, comparing the filling status to a threshold, taking a decision whether or not the command shall be transmitted toward the hygiene equipment, compiling the command, fetching the command or parts thereof, and generating the command or parts thereof.

8. The method according to claim 1, wherein said outbound data carries a command and the method further comprises initiating of the command, including comparing the filling status to a threshold.

9. A network-based service comprising the functionalities of:
receiving inbound data from a hygiene equipment, the inbound data indicating a filling status of the hygiene equipment acquired by a data acquisition unit of the hygiene equipment; and
transmitting outbound data to the hygiene equipment, the outbound data changing a behaviour with regard to a lock unit of the hygiene equipment based on the filling status of the hygiene equipment.

10. The network-based service of claim 9, wherein the functionalities are adapted to implement a method comprising the steps of:

receiving inbound data from a hygiene equipment, the inbound data indicating a filling status of the hygiene equipment acquired by a data acquisition unit of the hygiene equipment; and transmitting outbound data to the hygiene equipment, the outbound data changing a behaviour with regard to a lock unit of the hygiene equipment based on the filling status of the hygiene equipment, wherein the behaviour with regard to the lock unit of the hygiene equipment is changed when the filling status of the hygiene equipment indicates that the hygiene equipment needs to be refilled or emptied.

11. A piece of hygiene equipment, comprising:

a housing having an interior volume for holding a hygiene equipment product, the hygiene equipment housing having a fixed part and an openable part which is movable or removable with respect to the fixed part to provide access to the interior volume;

a lock unit configured to lock, in a locking state, the openable part to the fixed part of the hygiene equipment or unlock, in an unlocking state, the openable part from the fixed part of the hygiene equipment;

at least one transmitting unit configured to transmit inbound data indicating a filling status of the hygiene equipment to a data collection unit; and at least one receiving unit configured to receive outbound data from the data collection unit, the outbound data changing a behaviour with regard to the lock unit of the hygiene equipment based on the filling status of the hygiene equipment.

12. The piece of hygiene equipment according to claim 11, further comprising a data acquisition unit configured to acquire the filling status of the hygiene equipment.

13. The piece of hygiene equipment according to claim 11, wherein the behaviour with regard to the lock unit of the hygiene equipment is changed when the filling status of the hygiene equipment indicates that the hygiene equipment needs to be refilled or emptied.

14. The piece of hygiene equipment according to claim 11, wherein the behaviour with regard to the lock unit of the hygiene equipment is directed to a communication mode of the hygiene equipment.

15. The piece of hygiene equipment according to claim 14, wherein the behaviour comprises a receiving and/or transmitting characteristic, the receiving and/or transmitting characteristic indicating a radio scheme to be used by the hygiene equipment for communication and/or an occurrence rate with which the hygiene equipment enters a receiving mode to receive incoming data.

16. The piece of hygiene equipment according to claim 15, wherein the occurrence rate with which the hygiene equipment enters the receiving mode to receive the incoming data is increased when the filling status of the hygiene equipment indicates that the hygiene equipment needs to be refilled or emptied.

17. The piece of hygiene equipment according to claim 11, wherein the behaviour with regard to the lock unit of the hygiene equipment comprises the locking state and the unlocking state of the lock unit.

18. The piece of hygiene equipment according to claim 15, wherein the incoming data is a signal from the data collection unit, the signal instructing the lock unit to be in the locking state or in the unlocking state.

19. The piece of hygiene equipment according to claim 11, wherein the transmitting unit is configured to transmit the inbound data to the data collection unit according to a specific time interval.

20. The piece of hygiene equipment according to claim 11, wherein the transmitting unit is further configured to transmit lock data from the lock unit, the lock data comprising status information of the lock unit and/or status information of one or more batteries powering the hygiene equipment.

21. A method for a piece of hygiene equipment, wherein the piece of hygiene equipment comprises a hygiene equipment housing having an interior volume for holding a hygiene equipment product, the hygiene equipment housing having a fixed part and an openable part which is movable or removable with respect to the fixed part to provide access to the interior volume, and a lock unit to lock the openable part to the fixed part of the hygiene equipment or unlock the openable part from the fixed part of the hygiene equipment, the method comprising the steps of:

transmitting inbound data indicating the filling status of the hygiene equipment to a data collection unit; and receiving outbound data from the data collection unit, the outbound data changing a behaviour with regard to the lock unit of the hygiene equipment based on the filling status of the hygiene equipment.

22. A data collection unit, comprising:

a receiving unit configured to receive inbound data from a hygiene equipment, the inbound data indicating a filling status of the hygiene equipment acquired by a data acquisition unit of the hygiene equipment;

a processing unit configured to initiate a command toward the hygiene equipment to change a behaviour of a lock unit of the hygiene equipment based on the filling status; and a transmitting unit configured to transmit outbound data indicating the command to the hygiene equipment.

23. The data collection unit according to claim 22, wherein the behaviour with regard to the lock unit of the hygiene equipment is changed when the filling status of the hygiene equipment indicates that the hygiene equipment needs to be refilled or emptied.

24. The data collection unit according to claim 22, wherein the behaviour with regard to the lock unit of the hygiene equipment is directed to a communication mode of the hygiene equipment.

25. The data collection unit according to claim 24, wherein the behaviour comprises a receiving and/or transmitting characteristic, the receiving and/or transmitting characteristic indicating a radio scheme to be used by the hygiene equipment for communication and/or an occurrence rate with which the hygiene equipment enters a receiving mode to receive incoming data.

26. The data collection unit according to claim 25, wherein the occurrence rate with which the hygiene equipment enters the receiving mode to receive the incoming data is increased when the filling status of the hygiene equipment indicates that the hygiene equipment needs to be refilled or emptied.

27. The data collection unit according to claim 22, wherein the behaviour with regard to the lock unit of the hygiene equipment comprises a locking state and unlocking state of the lock unit.

28. The data collection unit according to claim 22, wherein said initiating of the command comprises any one of evaluating the filling status, comparing the filling status to a threshold, taking a decision whether or not the command shall be transmitted toward the hygiene equipment, compiling the command, fetching the command or parts thereof, and generating the command or parts thereof.

29. The data collection unit according to claim 22, wherein said initiating of the command comprises comparing the filling status to a threshold and the processing unit is configured to receive and store one or more thresholds via any one of a setting at a time of manufacturing and/or releasing to the market the data collection unit, setting and/or updating via a server or service, and setting locally via an interface of the data collection unit.

30. The data collection unit according to claim 22, wherein the receiving unit is further configured to receive a signal from an external device other than the hygiene equipment.

31. The data collection unit according to claim 30, wherein the signal from the external device indicates a presence of the external device in the vicinity of the data collection unit.

32. The data collection unit according to claim 22, wherein the receiving unit is configured to receive the inbound data from the hygiene equipment according to a specific time interval.

33. The data collection unit according to claim 22, wherein the receiving unit is further configured to receive lock data from the lock unit of the hygiene equipment, the lock data comprising status information of the lock unit and/or status information of one or more batteries powering the hygiene equipment.

34. The data collection unit according to claim 22, wherein the receiving unit is further configured to receive server data from a server, the server data being used for setting up the data collection unit and the hygiene equipment; and the transmitting unit is further configured to transmit data to the server, the data comprising identification information of the data collection unit, identification information of the hygiene equipment, a current state of the data collection unit, and/or a current state of the hygiene equipment.

35. The data collection unit according to claim 22, wherein the transmitting unit is configured to transmit outbound data to a plurality of pieces of hygiene equipment, the outbound data changing behaviours with regard to a plurality of lock units of the plurality of pieces of hygiene equipment based on each filling status of each piece of hygiene equipment.

36. A system, comprising:

a data collection unit comprising:

a receiving unit configured to receive inbound data from a hygiene equipment, the inbound data indicating a filling status of the hygiene equipment acquired by a data acquisition unit of the hygiene equipment;

a processing unit configured to initiate a command toward the hygiene equipment to change a behaviour of a lock unit of the hygiene equipment based on the filling status; and a transmitting unit configured to transmit outbound data indicating the command to the hygiene equipment; and a piece of hygiene equipment comprising:

a housing having an interior volume for holding a hygiene equipment product, the hygiene equipment housing having a fixed part and an openable part which is movable or removable with respect to the fixed part to provide access to the interior volume;

a lock unit configured to lock, in a locking state, the openable part to the fixed part of the hygiene equipment or unlock, in an unlocking state, the openable part from the fixed part of the hygiene equipment;

at least one transmitting unit configured to transmit inbound data indicating a filling status of the hygiene equipment to a data collection unit; and at least one receiving unit configured to receive outbound data from the data collection unit, the outbound data changing a behaviour with regard to the lock unit of the hygiene equipment based on the filling status of the hygiene equipment.

* * * * *